United States Patent
Nagano

[11] Patent Number: 6,126,537
[45] Date of Patent: Oct. 3, 2000

[54] BLOWER UNIT FOR AIR CONDITIONING SYSTEM FOR AUTOMOTIVE VEHICLES

[75] Inventor: Hideki Nagano, Saitama-ken, Japan

[73] Assignee: Zexel Corporation, Tokyo, Japan

[21] Appl. No.: 09/329,023

[22] Filed: Jun. 9, 1999

[30] Foreign Application Priority Data

Sep. 28, 1998 [JP] Japan .................................. 10-272990

[51] Int. Cl.$^7$ ...................................................... B60H 1/06
[52] U.S. Cl. ............................................ 454/139; 62/244
[58] Field of Search .................................... 454/139, 156; 62/244; 165/42, 43

[56] References Cited

U.S. PATENT DOCUMENTS 6,009,934  1/2000  Sunaga et al. ............................. 165/42

FOREIGN PATENT DOCUMENTS

5-38928  2/1993  Japan .

Primary Examiner—Harold Joyce
Attorney, Agent, or Firm—Frishauf, Holtz, Goodman, Langer, Chick, P.C.

[57] ABSTRACT

There is provided a blower unit for an air conditioning system for an automotive vehicle. A casing accommodates a blower. The casing is formed with a recirculating air intake port for introducing recirculating air and a fresh air intake port for introducing fresh air. A recirculating air intake door opens and closes the recirculating air intake port. A fresh air intake door opens and closes the fresh air intake port. A linkage links the recirculating air intake door and the fresh air intake door to each other, thereby interlocking the recirculating air intake door and the fresh air intake door to each other. The linkage comprises linked state-setting means for selectively setting a linked state of the recirculating air intake door and the fresh air intake door to one of a first linked state in which when one of the recirculating air intake door and the fresh air intake door is fully closed, another of the recirculating air intake door and the fresh air intake door is opened to a first angle, and a second linked state in which when the one of the recirculating air intake door and the fresh air intake door is fully closed, the another of the recirculating air intake door and the fresh air intake door is opened to a second angle smaller than the first angle.

10 Claims, 9 Drawing Sheets

BLOWER UNIT FOR AIR CONDITIONING SYSTEM FOR AUTOMOTIVE VEHICLES

BACKGROUND OF THE INVENTION

1. Field of the Invention

This invention relates to a blower unit for an air conditioning system for use in an automotive vehicle.

2. Description of the Prior Art

Figure 1:
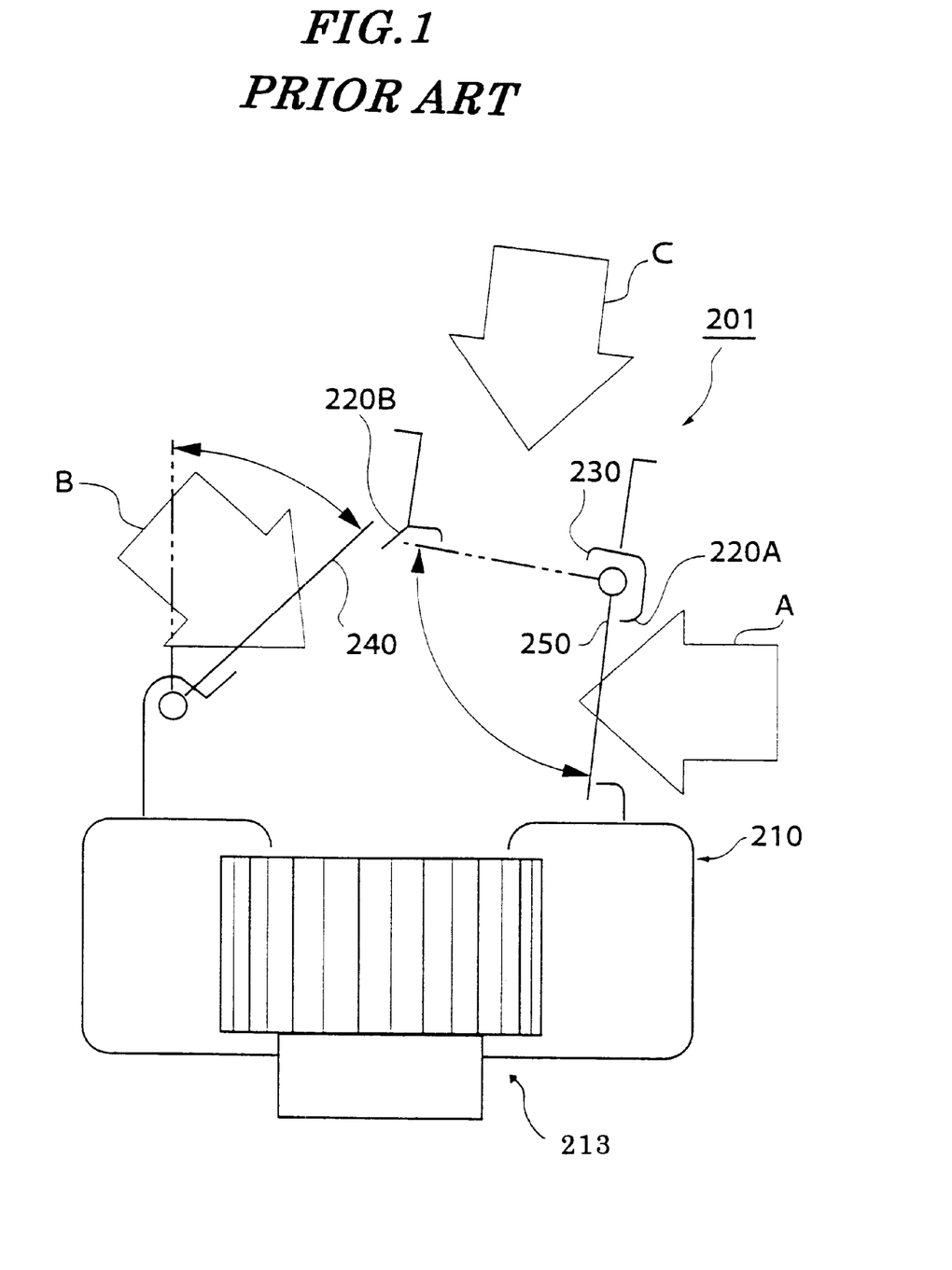
FIG. 1 is a view schematically showing the construction of a conventional blower unit for an air conditioning system for an automotive vehicle.

FIG. 1 schematically shows the construction of a conventional blower unit for an air conditioning system installed on an automotive vehicle.

The blower unit 201 is comprised of a blower unit casing 210 for accommodating a blower 213, two recirculating air intake ports 220A, 220B formed through the blower unit casing 210 for introducing recirculating air A, B, a fresh air intake port 230 formed through the same for introducing fresh air C, a recirculating air intake door 240 for opening/closing the recirculating air intake port 220B, and a recirculating/fresh air intake door 250 for selectively opening/closing the fresh air intake port 230 and the recirculating air intake port 220A.

Figure 2:
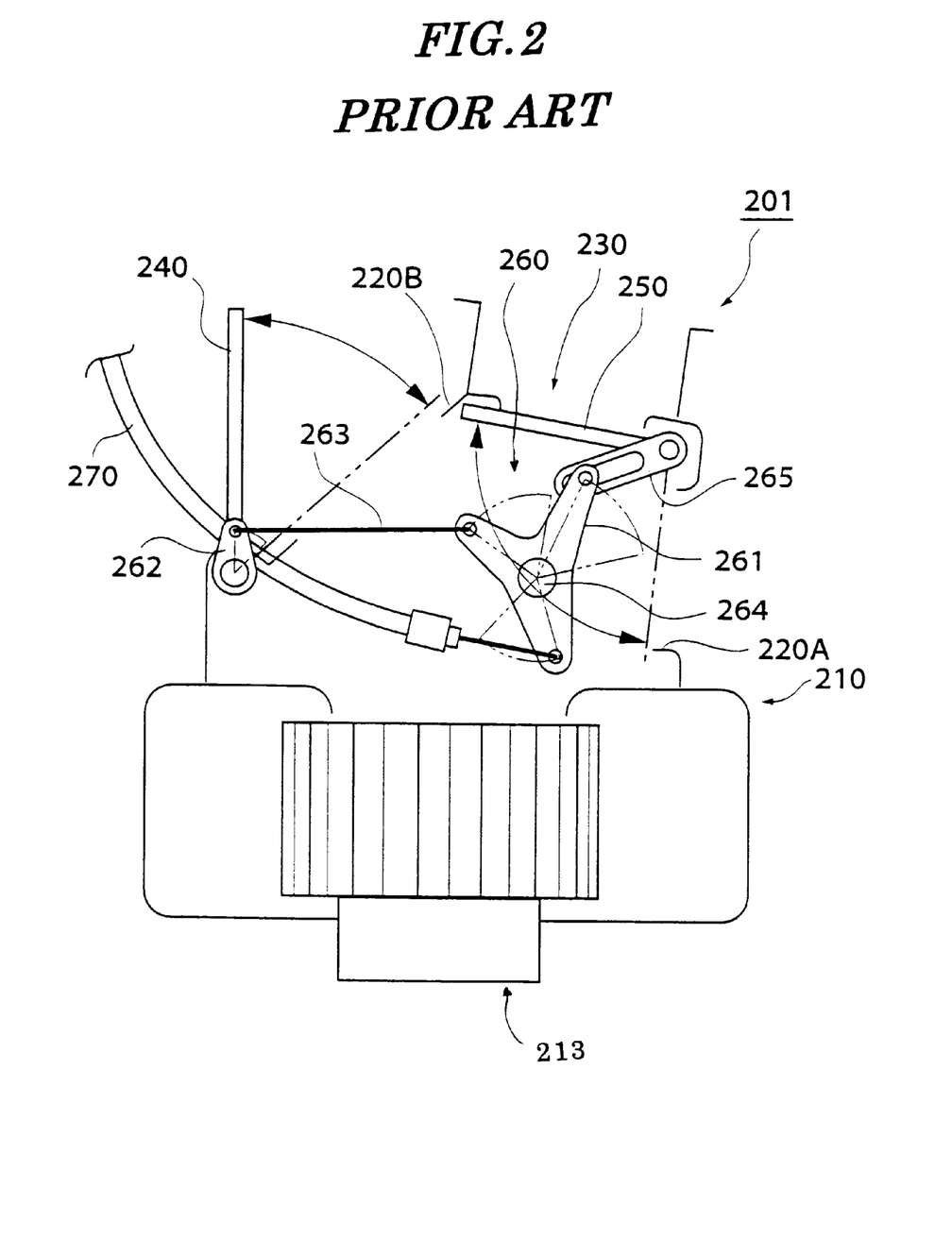
FIG. 2 is a view showing the construction of the conventional blower unit, which is also useful in explaining the operation of the same.

FIG. 2 is a view showing details of construction of the conventional blower unit, which is also useful for explaining the operation of the same.

The blower unit 201 includes a linkage 260.

The doors 240 and 250 are linked to each other by the linkage 260 and thereby interlocked for opening/closing the recirculating air intake ports 220A, 220B and the fresh air intake port 230.

The linkage 260 is comprised of a driving pivotal lever 261 for transmitting torque to the recirculating/fresh air intake door 250, a driven pivotal lever 262 for transmitting torque to the recirculating air intake door 240, and a rod 263 connecting between the levers 261, 262, for transmitting the torque of the driving pivotal lever 261 to the driven pivotal lever 262.

The driving pivotal lever 261 having three ends is supported by a pivot 264 in a manner pivotally movable about the same. The driving pivotal lever 261 has one end connected to the door 250 by a guide block 265 and another end connected to a cable 270 for pushing/pulling the lever 261.

The rod 263 has one end thereof attached to the other end of the driving pivotal lever 261 and the other end thereof attached to one end of the driven pivotal lever 262. The recirculating air intake door 240 is attached to the other end of the driven pivotal lever 262.

The recirculating air intake door 240 and the recirculating/fresh air intake door 250 each pivotally move between two positions indicated by solid lines and a two-dot chain line in a manner interlocked with each other, whereby switching takes place between a recirculating air mode and a fresh air mode.

Figure 3:
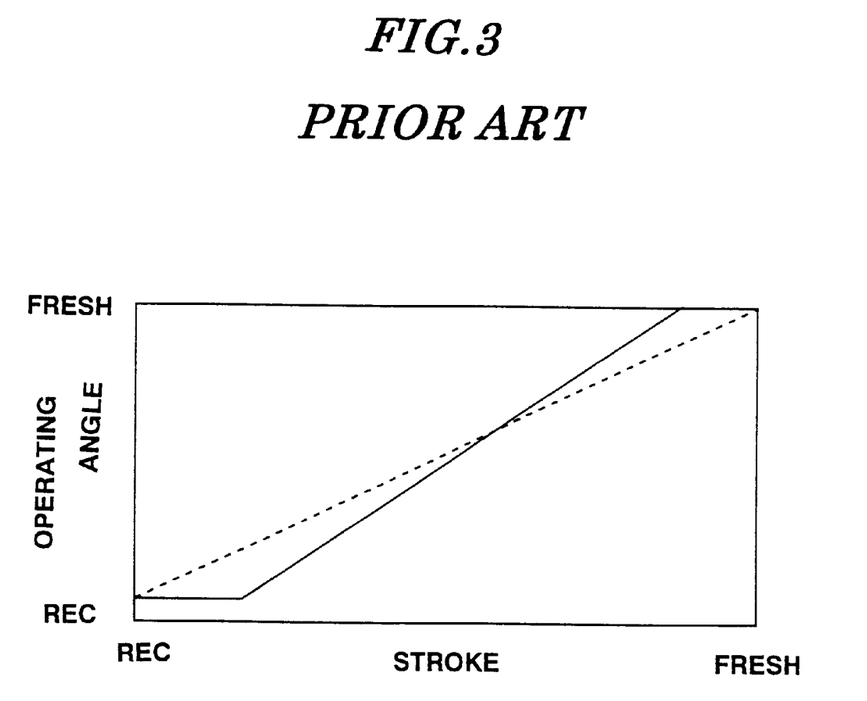
FIG. 3 is a diagram showing the relationship between the stroke of a driving pivotal lever and operating angles of two doors of the conventional blower unit.

FIG. 3 shows the relationship between the stroke of the driving pivotal lever (more specifically, the stroke of the other end of the lever 261 connected to the rod 263) and operating angles of the two doors.

In the figure, the ordinate represents the operating angles of the doors 240, 250, while the abscissa represents the stroke of the driving pivotal lever 261. The operating angle of the recirculating/fresh air intake door 250 is represented by a solid line, and that of the recirculating air intake door 240 by a broken line.

When the driving pivotal lever 261 is pulled by the cable 270 to have the other end thereof pivotally moved in a clockwise direction over a predetermined stroke, the recirculating air intake door 250 is pivotally moved in a counterclockwise direction to open the fresh air intake port 230 and at the same time close the recirculating air intake port 220A.

At the same time, the driven pivotal lever 262 is pulled by the rod 263 for rotation in a clockwise direction, whereby the recirculating air intake door 240 is pivotally moved in the same direction to close the other recirculating air intake port 220B.

That is, when the doors 250 and 240 are rotated or pivotally moved to the positions indicated by the respective two-dot chain lines (see FIG. 2), the two recirculating air intake ports 220A, 220B are both completely closed.

Air conditioning units are often shipped with no evaporator or filter mounted therein.

However, if the blower unit 210 is driven without e.g. an evaporator in the air conditioning unit, the airflow is increased by a rate corresponding to pressure loss caused by removal of the evaporator from a space in which it is to be mounted. To preclude this inconvenience, an airflow resistance is created within the system. More specifically, when the evaporator is not mounted in the air conditioning unit, an airflow resistance-creating member (such as a perforated steel plate, a net, etc.) as a substitute for the evaporator is provided in the space where the evaporator is to be mounted to create the airflow resistance on an air outlet side of the blower 213, as disclosed in Japanese Laid-Open Patent Publication No. 5-38928.

However, almost all of such airflow resistance-creating members are discarded after air conditioning units are installed on respective automotive vehicles. This uselessly increases manufacturing costs of the air conditioning system.

SUMMARY OF THE INVENTION

It is an object of the invention to provide a blower unit for an air conditioning system for an automotive vehicle, which dispenses with an airflow resistance-creating member to be mounted in an air conditioning unit before shipping, and thereby permits reduction of manufacturing costs of the air conditioning system.

To attain the above object, the invention provides a blower unit for an air conditioning system for an automotive vehicle, comprising:

a blower;

a casing for accommodating the blower;

a recirculating air intake port formed in the casing, for introducing recirculating air;

a fresh air intake port formed in the casing, for introducing fresh air;

a recirculating air intake door for opening and closing the recirculating air intake port;

a fresh air intake door for opening and closing the fresh air intake door; and a linkage linking the recirculating air intake door and the fresh air intake door to each other, thereby interlocking the recirculating air intake door and the fresh air intake door to each other, the linkage having linked state-setting means for selectively setting a linked state of the recirculating air intake door and the fresh air intake door to one of a first linked state in which when one of the recirculating air intake door and the fresh air intake door is fully closed, another of the recirculating air intake door and the fresh air intake door is opened to a first angle, and a second linked state in which when the one of the recirculating air intake door and the fresh air intake door is fully closed, the another of the recirculating air intake door and the fresh air intake door is opened to a second angle smaller than the first angle.

According to this blower unit, it is possible to selectively set the linked state of the recirculating air intake door and the fresh air intake door to either of the first linked state and the second linked state. Therefore, the maximum opening of the other of the recirculating air intake door and the fresh air intake door can be changed, whereby the airflow resistance of the blower unit can be adjusted to thereby adjust the airflow.

Preferably, the linkage comprises a driving pivotal lever for transmitting a driving force to the one of the recirculating air intake door and the fresh air intake door, a driven pivotal lever for transmitting a driving force to the another of the recirculating air intake door and the fresh air intake door, and a rod connecting between the driving pivotal lever and the driven pivotal lever, for transmitting a driving force of the driving pivotal lever to the driven pivotal lever, and the linked state-setting means comprises a portion of one of the driving pivotal lever and the driven pivotal lever, the portion defining at least two engaging holes therein for engagement with the rod to thereby selectively realize one of the first linked state and the second linked state of the recirculating air intake door and the fresh air intake door.

According to this preferred embodiment, by selectively engaging the rod in one of the engaging holes formed in one of the driving pivotal lever and the driven pivotal lever, the linkage can be selectively set to one of the first linked state and the second linked state of the recirculating air intake door and the fresh air intake door.

Preferably, the driving pivotal lever transmits the driving force to the fresh air intake door, and wherein the driven pivotal lever transmits the driving force to the recirculating air intake door.

Further preferably, in the first linked state, when the fresh air intake door is fully closed, the recirculating air intake door is opened to the first angle, and in the second linked state, when the fresh air intake door is fully closed, the recirculating air intake is opened to the second angle smaller than the first angle.

According to this preferred embodiment, by selectively engaging the rod in one of the engaging holes formed in one of the driving pivotal lever and the driven pivotal lever, the operating angle of the driven pivotal lever is changed, whereby the opening of the recirculating air intake door is changed for adjustment of the airflow resistance of the blower unit when the recirculating air is introduced via the recirculating air intake port.

Preferably, the blower unit includes actuating means connected to the driving pivotal lever, for selectively actuating the driving pivotal level in one of two opposite directions.

For instance, the actuating means comprises a cable.

Preferably, the blower unit includes another recirculating intake port that is opened by the fresh air intake door when the fresh air intake port is closed by the fresh air intake door, and closed by the fresh air intake door when the fresh air intake port is opened by the fresh air intake door.

More preferably, the blower unit includes a cable for actuating the driving pivotal lever, the cable having a fitting portion, and the linked state-setting means comprises a portion of the driving pivotal lever, the portion defining at least two engaging holes therein for selective engagement with the fitting portion of the cable, to thereby selectively realize one of the first linked state and the second linked state of the recirculating air intake door and the fresh air intake door.

According to this preferred embodiment, by selectively engaging the rod in one of the engaging holes formed in the driving pivotal lever, the operating angle of the driven pivotal lever is changed, whereby the opening of the recirculating air intake door is changed for adjustment of the airflow resistance of the blower unit when the recirculating air is introduced via the recirculating air intake port.

Further preferably, the cable has an end cover, and the linked state-setting means comprises a plurality of cable holders formed on the casing, for selective engagement with the fitting portion of the cable.

According to this preferred embodiment, since the cable holders are formed on the casing for engagement with the end cover of the cable, it is possible to selectively secure the cable in an optimal position corresponding to a desired operating angle of the driving pivotal lever.

The above and other objects, features and advantages of the present invention will become more apparent from the following detailed description taken in conjunction with accompanying drawings.

DETAILED DESCRIPTION OF THE PREFERRED EMBODIMENTS

The invention will now be described in detail with reference to drawings showing preferred embodiments thereof.

Figure 4:
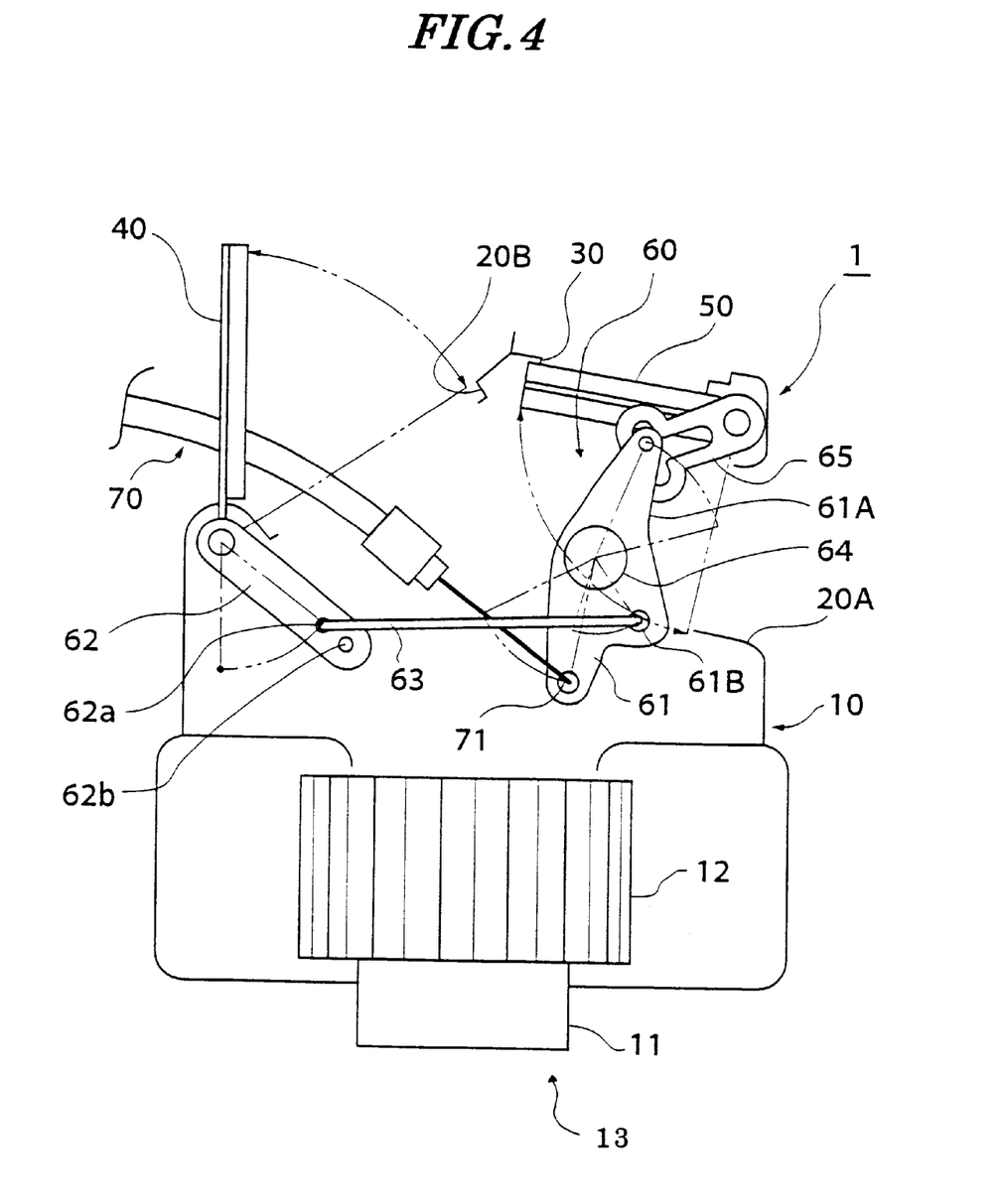
FIG. 4 is a view showing the construction of a blower unit for an air conditioning system installed on an automotive vehicle, according to a first embodiment of the invention, which is useful in explaining the operation of the blower unit performed when an evaporator is mounted in the air conditioning system.

FIG. 4 is a view showing the construction of a blower unit for an air conditioning system installed on an automotive vehicle, according to a first embodiment of the invention, which is useful in explaining the operation of the blower unit performed when an evaporator is mounted in the air conditioning system.

The blower unit 1 is comprised of a blower unit casing 10, recirculating air intake ports 20A, 20B, a fresh air intake port 30, a recirculating air intake door 40, a fresh air intake door 50, and a linkage 60.

The blower unit casing 10 accommodates an impeller 12 driven by a motor 11. The motor 11 and the impeller 12 constitute a blower 13.

The recirculating air intake ports 20A, 20B are formed through the blower unit casing 10, for introducing air within a compartment of the vehicle (i.e. recirculating air) into the blower unit casing 10.

The fresh air intake port 30 is also formed through the blower unit casing 10, for introducing air outside the compartment (i.e. fresh air) into the blower unit casing 10.

The linkage 60 is comprised of a driving pivotal lever 61 for transmitting torque to the fresh air intake door 50, a driven pivotal lever 62 for transmitting torque to the recirculating air intake door 40, a rod 63 connecting between the driving pivotal lever 61 and the driven pivotal lever 62, for transmitting the torque of the driving pivotal lever 61 to the driven pivotal lever 62, and a guide block 65.

The doors 40 and 50 are actuated by the linkage 60 and stopped at respective predetermined open/closed positions by the same.

The doors 40 and 50 are each pivotally moved between a position indicated by solid lines and a position indicated by a two-dot chain line. The fresh air intake door 50 is not operated until the driving pivotal lever 61 moves through a portion "d" of the stroke thereof and operated as the same moves through the remainder of the stroke (see FIG. 6).

The driving pivotal lever 61 is supported by a pivot 64 in a manner pivotally movable about the same. The lever 61 is formed by a longitudinal portion 61A extending along the longer side thereof with the pivot 64 rotatably fitted in a central through hole thereof and a transverse portion 61B protruding from an intermediate portion of the longitudinal portion 61A.

The longitudinal portion 61A has one end thereof connected to the fresh air intake door 50 by the guide block 65 and the other end thereof engaged with a fitting portion 71 of a cable 70 for moving the driving pivotal lever 61.

The rod 63 has one end thereof attached to an end of the transverse portion 61B of the lever 61 and the other end thereof attached to one end of the driven pivotal lever 62. The lever 62 has the other end thereof attached to the recirculating air intake door 40.

At the one end of the lever 62, there are formed two engaging holes 62a, 62b for engagement with the rod 63 for adjusting the degree of opening of the recirculating air intake door 40. In FIG. 4, the rod 63 is engaged in the hole 62a. The one end of the lever 62 defining the engaging holes 62a, 62b constitutes the linked state-setting means of the present embodiment.

In FIG. 4, the two recirculating air intake ports 20A, 20B are both fully opened, and the fresh air intake port 30 is closed. When the blower 13 is driven in this state, the air-conditioning system operates in a recirculating air (REC) mode in which recirculating air is introduced into the blower unit casing 10 via the recirculating air intake ports 20A, 20B, whereby air in the compartment is recirculated.

Figure 5:
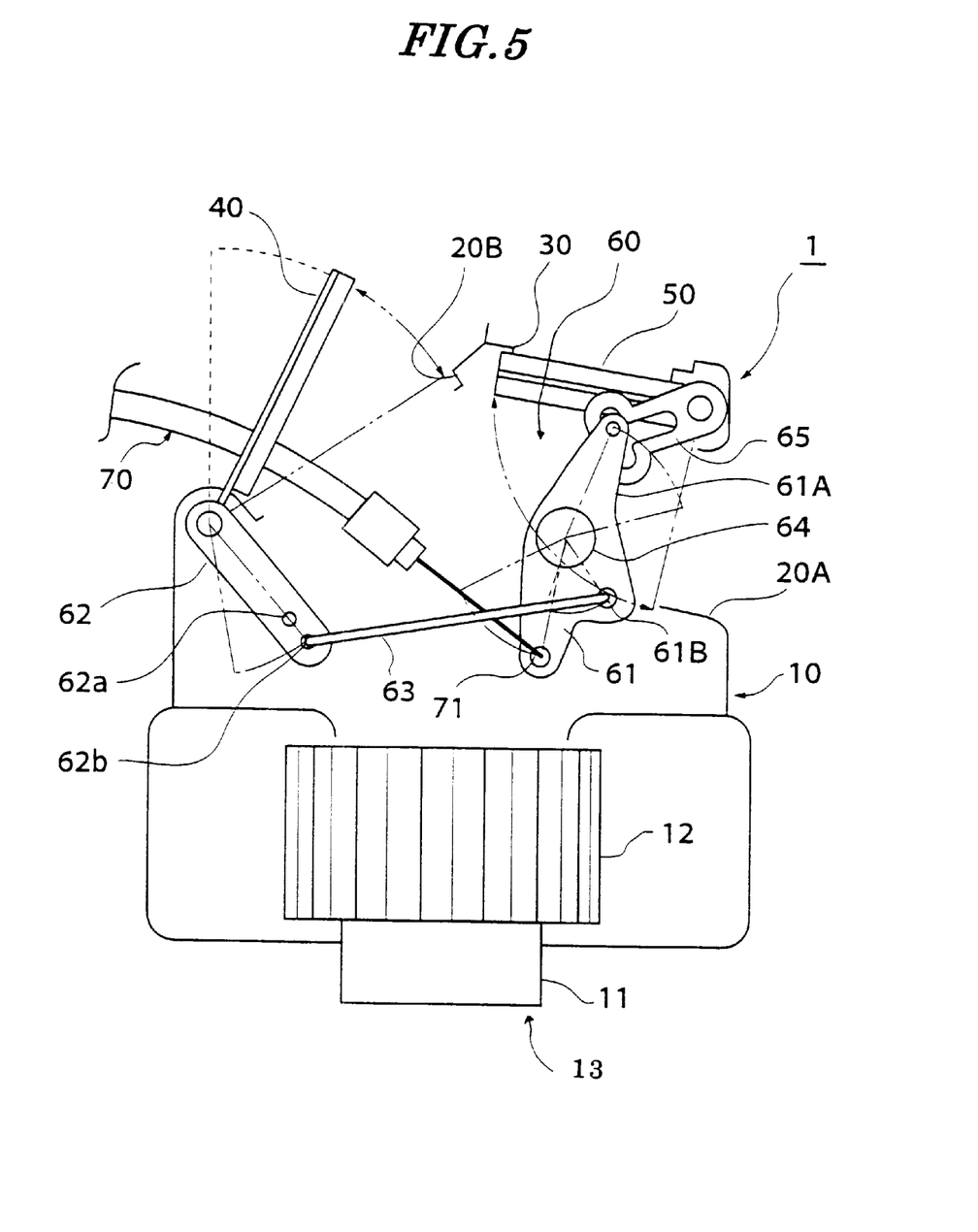
FIG. 5 is a view showing the construction of the blower unit according to the first embodiment, which is useful in explaining the operation of the blower unit performed when no evaporator is mounted in the air conditioning system.

FIG. 5 is another view showing the construction of the blower unit, which is useful in explaining the operation of the blower unit according to the first embodiment performed when no evaporator is mounted in the air conditioning system.

The rod 63 is engaged in the engaging hole 62b, so that the driven pivotal lever 62 is shifted in the clockwise direction and the recirculating air intake door 40 is shifted to a position indicated by solid lines, when the fresh air intake door 50 is in its fully closed position. A broken line in the figure indicates the fully opened position of the door 40 in the state of the rod 63 being engaged in the engaging hole 62a.

When the rod 63 is engaged in the engaging hole 62b, an area of the opening of the recirculating air intake port 20B is decreased, whereby airflow resistance is increased in the recirculating air mode. The maximum opening of the door 40 is adjusted such that the same airflow resistance is attained as provided by the air conditioning system having an evaporator mounted therein.

Figure 6:
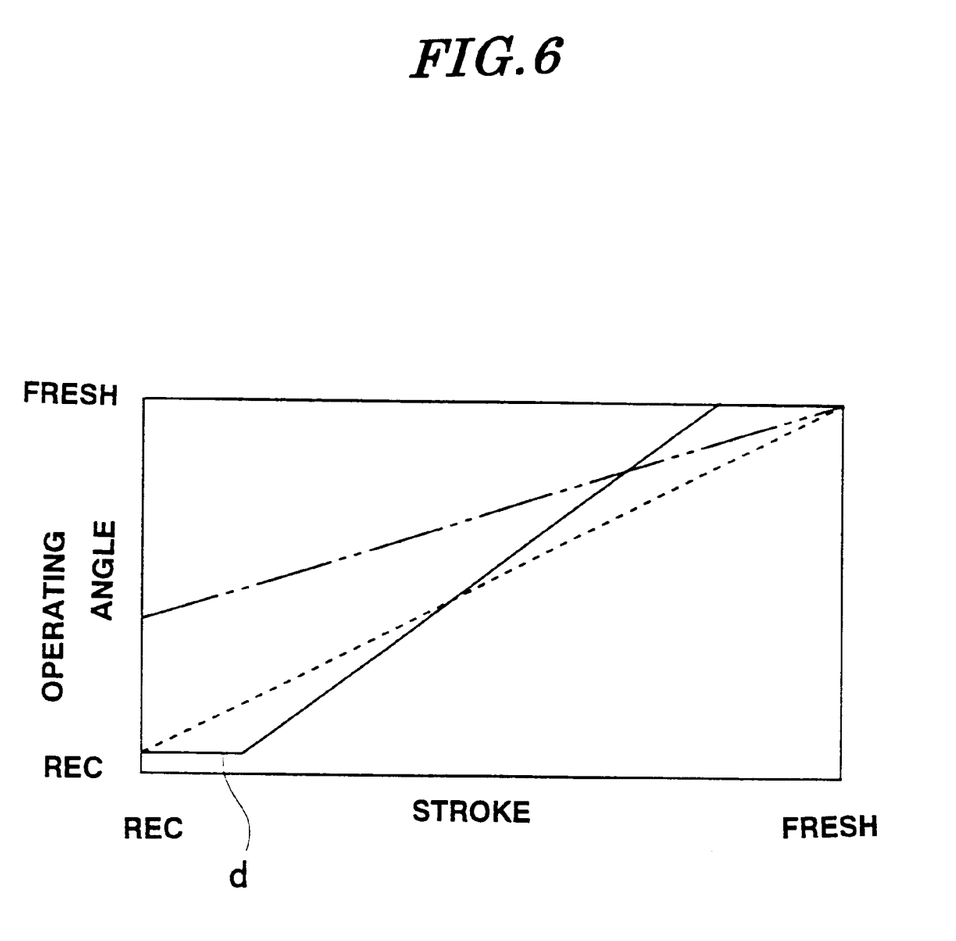
FIG. 6 is a diagram showing the relationship between the stroke of a driving pivotal lever and operating angles of two doors of the blower unit according to the first embodiment.

FIG. 6 shows the relationship between the stroke of the driving pivotal lever and operating angles of the two doors.

The ordinate in the figure represents operating angles of the doors 40, 50, while the abscissa represents the stroke of the driving pivotal lever 61 (more specifically, the stroke of the other end of the longitudinal portion 61A of the driving pivotal lever 61). The solid line indicates the operating angle of the fresh air intake door 50, and the broken line indicates the operating angle of the recirculating air intake door 40 in FIG. 4, while the two-dot chain line indicates that of the recirculating air intake door 40 in FIG. 5.

When the driving pivotal lever 61 is pulled by the cable 70 to have the other end of the longitudinal portion 61A thereof pivotally moved in the clockwise direction over a predetermined stroke, the fresh air intake door 50 is pivotally moved in the counterclockwise direction to open the fresh air intake port 30 and at the same time close the recirculating air intake port 20A. Also simultaneously, the driven pivotal lever 62 is urged by the rod 63 and pivotally moved in a clockwise direction, causing the pivotal motion of the recirculating air intake door 40 in the same direction to close the recirculating air intake port 20B. That is, when the driving pivotal lever 61 is pivotally moved in the clockwise direction over the predetermined stroke, the fresh air intake door 50 and the recirculating air intake door 40 are moved to positions indicated by respective two two-dot chain lines appearing in FIG. 4 and FIG. 5, whereby the two recirculating air intake ports 20A, 20B are both completely closed in both of the FIG. 4 and FIG. 5 cases. When the blower 13 is driven in this state, the air-conditioning system operates in a fresh air (FRESH) mode in which fresh air is introduced via the fresh air intake port 30.

According to this embodiment, it is possible to increase the airflow resistance provided by the system when it is in the recirculating air mode, i.e. when the two ports 20A, 20B are open to permit the larger airflow into the system, simply by selectively bringing the rod 63 into engagement in the engaging hole 62a or 62b of the driven pivotal lever 62. Therefore, it is not required to use an airflow resistance-creating member as in the prior art, which contributes to reduction of the manufacturing costs of the air conditioning system.

Figure 7:
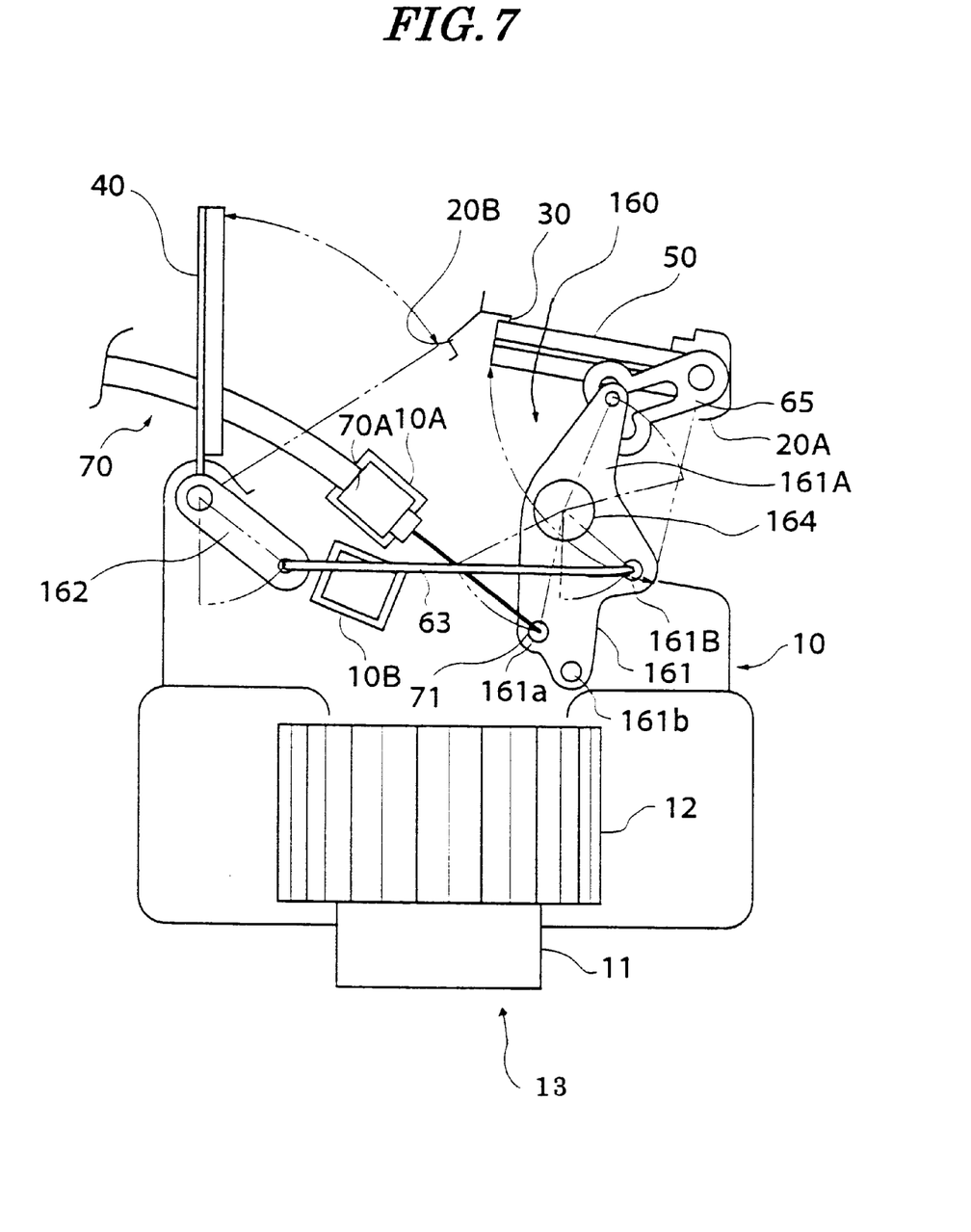
FIG. 7 is a view showing the construction of a blower unit for an air conditioning system installed on an automotive vehicle, according to a second embodiment of the invention, which is useful in explaining the operation of the blower unit performed when an evaporator is mounted in the air conditioning system.

FIG. 7 is a view showing the construction of a blower unit for an air conditioning system installed on an automotive vehicle, according to a second embodiment of the invention, which is useful in explaining the operation of the blower unit performed when an evaporator is mounted in the air conditioning system. Component parts and elements identical with those of the first embodiment are indicated by identical reference numerals, and description thereof is omitted.

A driving pivotal lever 161 is supported by a pivot 164 in a manner pivotally movable about the same. The lever 161 is formed by a longitudinal portion 161A and a transverse portion 161B.

The longitudinal portion 161A has one end thereof connected to a fresh air intake door 50 by a guide block 65 and the other end thereof engaged with a fitting portion 71 of a cable 70 for moving the driving pivotal lever 161.

In the above other end of the longitudinal portion 161A, there are formed two engaging holes 161a, 161b. The fitting portion 71 of the cable 70 is engaged in the engaging hole 161a in FIG. 7. The other end of the longitudinal portion 161A defining the two engaging holes 161a, 161b constitutes linked state-setting means of the present embodiment.

The cable 70 has an end cover 70A engaged with a cable holder 10A formed on a blower unit casing 10.

A rod 63 has one end thereof attached to an end of the transverse portion 161B of the lever 161 and the other end thereof attached to one end of the driven pivotal lever 162. The lever 162 has the other end thereof attached to the recirculating air intake door 40.

The driving pivotal lever 161, the driven pivotal lever 162, and the rod 63 constitute a linkage 160.

In FIG. 7, two recirculating air intake ports 20A, 20B are both fully opened, and a fresh air intake port 30 is closed. When a blower 13 is driven in this state, the air-conditioning system operates in a recirculating air (REC) mode in which air in a compartment of the vehicle is introduced into the blower unit casing 10 via the recirculating air intake ports 20A, 20B, whereby recirculation of inside air (recirculating air) is carried out.

Figure 8:
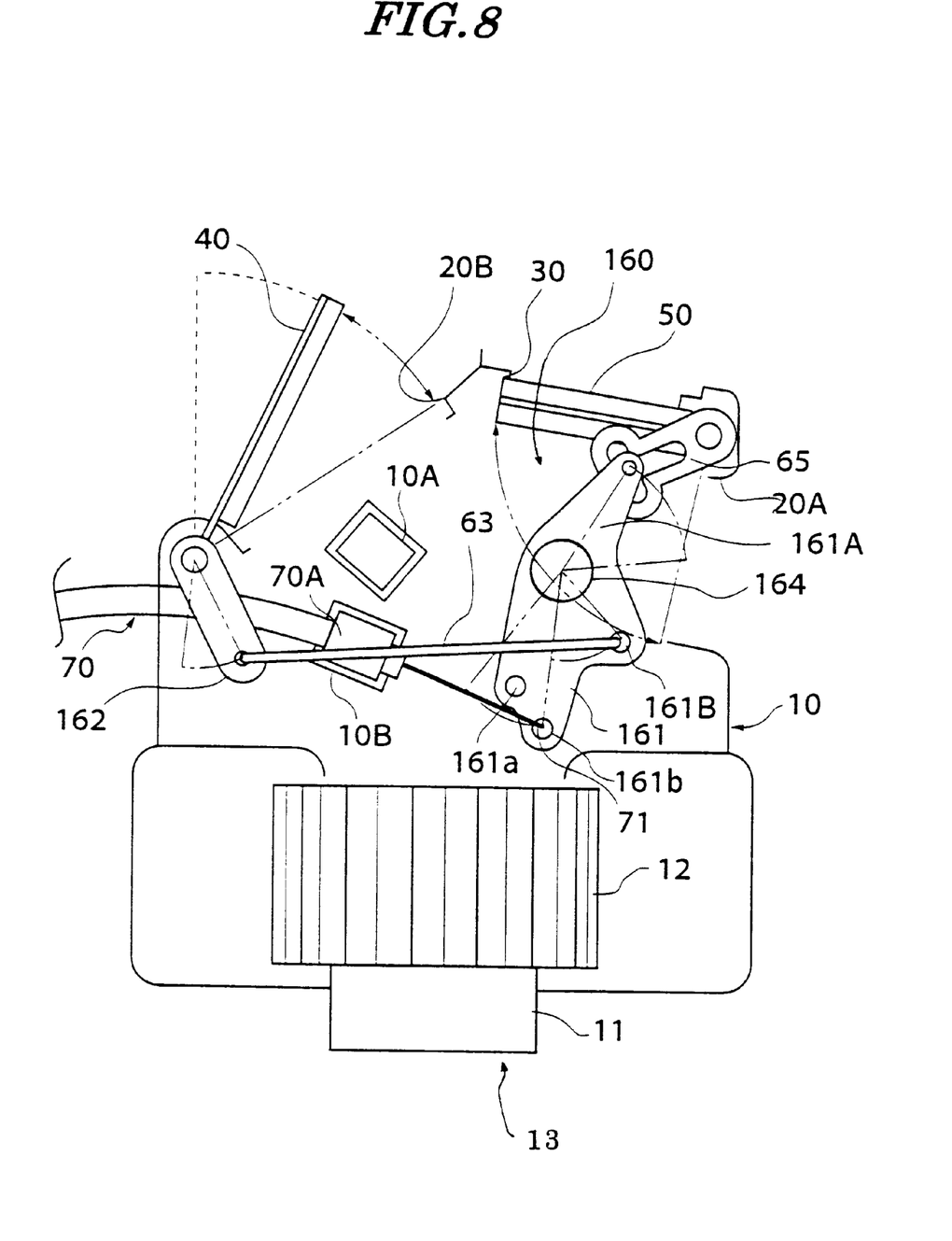
FIG. 8 is a view showing the construction of the blower unit according to the second embodiment, which is useful in explaining the operation of the blower unit performed when no evaporator is mounted in the air conditioning system.

FIG. 8 is another view showing the construction of the blower unit, which is useful in explaining the operation of the blower unit according to the second embodiment performed when no evaporator is mounted in the air conditioning system.

The fitting portion 71 of the cable 70 is engaged not in the engaging hole 161a but in the engaging hole 161b, and the end cover 70A of the cable 70 is engaged not with the cable holder 10A but with a cable holder 10B also formed on the blower unit casing 10, so that when the fresh air intake door 50 is in its fully closed position, the driven pivotal lever 162 is shifted in the clockwise direction, and the recirculating air intake door 40 is shifted to a position indicated by solid lines.

As a result, the area of opening of the recirculating air intake port 20B is decreased, whereby airflow resistance is increased in the recirculating air mode. The maximum opening of the door 40 is adjusted such that the same airflow resistance is attained as provided by the air conditioning system having an evaporator mounted therein.

Figure 9:
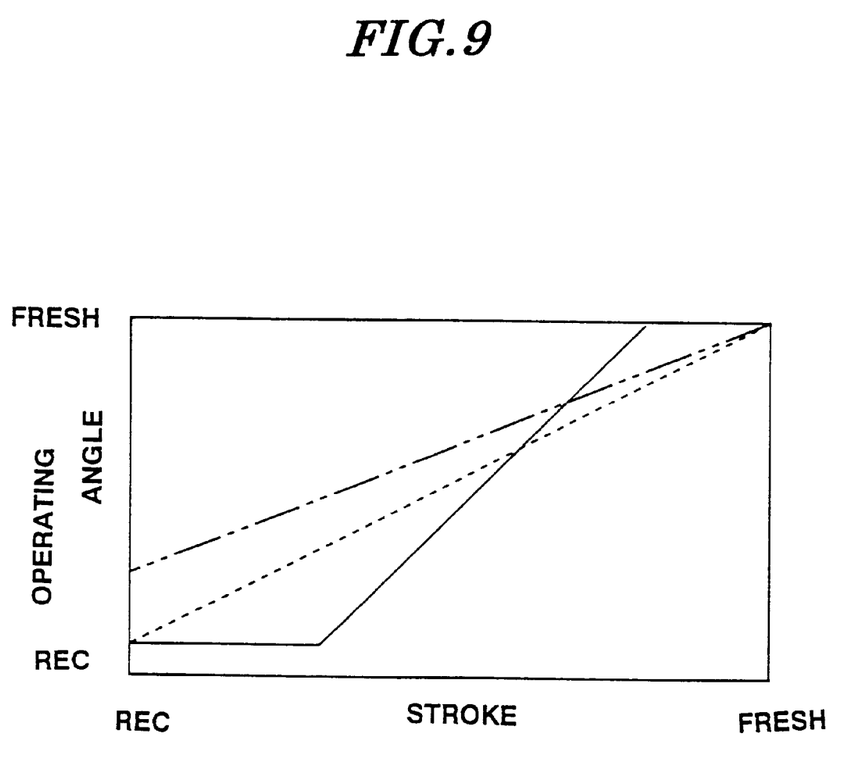
FIG. 9 is a diagram showing the relationship between the stroke of a driving pivotal lever and operating angles of two doors of the blower unit according to the second embodiment.

FIG. 9 shows the relationship between the stroke of the driving pivotal lever and operating angles of the two doors.

The ordinate in the figure represents the operating angles of the doors 40, 50, while the abscissa represents the stroke of the driving pivotal lever 161 (more specifically, the stroke of the other end of the longitudinal portion 161A of the driving pivotal lever 161). The solid line indicates the operating angle of the fresh air intake door 50, and the broken line indicates the operating angle of the recirculating air intake door 40 in FIG. 7, while the two-dot chain line indicates that of the recirculating air intake door 40 in FIG. 8.

When the driving pivotal lever 61 is pulled by the cable 70 to have the other end of the longitudinal portion 161A thereof pivotally moved in the clockwise direction over a predetermined stroke, the fresh air intake door 50 is pivotally moved in the counterclockwise direction to open the fresh air intake port 30 and at the same time close the recirculating air intake port 20A. Also simultaneously, the driven pivotal lever 162 is urged by the rod 63 and pivotally moved in a clockwise direction, causing the pivotal motion of the recirculating air intake door 40 in the same direction to close the recirculating air intake port 20B. That is, when the driving pivotal lever 161 is pivotally moved in the clockwise direction over the predetermined stroke, the fresh air intake door 50 and the recirculating air intake door 40 are moved to positions indicated by respective two two-dot chain lines appearing in FIG. 7 and FIG. 8, whereby the two recirculating air intake ports 20A, 20B are both completely closed in both of the FIG. 7 and FIG. 8 cases. When the blower 13 is driven in this state, the air-conditioning system operates in a fresh air (FRESH) mode in which fresh air is introduced via the fresh air intake port 30.

The second embodiment provides the same effect as obtained by the first embodiment.

Further, in the present embodiment, the blower unit casing 10 is formed with the cable holders 10A, 10B for engagement with the end cover 70A of the cable 70, so that it is possible to selectively secure the cable 70 in an optimal position corresponding to a desired operating angle of the driving pivotal lever 161.

Although in the above embodiments, the cable 70 is used to pivotally move the driving pivotal levers 61, 161 over the predetermined stroke, this is not limitative, but a servomotor may be used to move the levers 61, 161 over a stroke corresponding to the motion of the servomotor.

Further, although in the above embodiments, only the cases are described in which no evaporator is mounted in the air conditioning system, the present invention can also be applied when a filter is not mounted in the air conditioning system.

It is further understood by those skilled in the art that the foregoing is the preferred embodiments of the invention, and that various changes and modification may be made without departing from the spirit and scope thereof.

What is claimed is:

1. A blower unit for an air conditioning system for an automotive vehicle, comprising:
    a blower;
    a casing for accommodating said blower;
    a recirculating air intake port formed in said casing, for introducing recirculating air;
    a fresh air intake port formed in said casing, for introducing fresh air;
    a recirculating air intake door for opening and closing said recirculating air intake port;
    a fresh air intake door for opening and closing said fresh air intake port; and
    a linkage linking said recirculating air intake door and said fresh air intake door to each other, thereby interlocking said recirculating air intake door and said fresh air intake door to each other,
    said linkage having linked state-setting means for selectively setting a linked state of said recirculating air intake door and said fresh air intake door to one of a first linked state in which when one of said recirculating air intake door and said fresh air intake door is fully closed, another of said recirculating air intake door and said fresh air intake door is opened to a first angle, and a second linked state in which when said one of said recirculating air intake door and said fresh air intake door is fully closed, said another of said recirculating air intake door and said fresh air intake door is opened to a second angle smaller than said first angle.

2. A blower unit according to claim 1, wherein said linkage comprises a driving pivotal lever for transmitting a driving force to said one of said recirculating air intake door and said fresh air intake door, a driven pivotal lever for transmitting a driving force to said another of said recirculating air intake door and said fresh air intake door, and a rod connecting between said driving pivotal lever and said driven pivotal lever, for transmitting a driving force of said driving pivotal lever to said driven pivotal lever, and wherein said linked state-setting means comprises a portion of one of said driving pivotal lever and said driven pivotal lever, said portion defining at least two engaging holes therein for engagement with said rod to thereby selectively realize one of said first linked state and said second linked state of said recirculating air intake door and said fresh air intake door.

3. A blower unit according to claim 2, wherein said driving pivotal lever transmits said driving force to said fresh air intake door, and wherein said driven pivotal lever transmits said driving force to said recirculating air intake door.

4. A blower unit according to claim 3, wherein in said first linked state, when said fresh air intake door is fully closed, said recirculating air intake door is opened to said first angle, and wherein in said second linked state, when said fresh air intake door is fully closed, said recirculating air intake is opened to said second angle smaller than said first angle.

5. A blower unit according to claim 1, including actuating means connected to said driving pivotal lever, for selectively actuating said driving pivotal level in one of two opposite directions.

6. A blower unit according to claim 5, wherein said actuating means comprises a cable.

7. A blower unit according to claim 1, including another recirculating intake port that is opened by said fresh air intake door when said fresh air intake port is closed by said fresh air intake door, and closed by said fresh air intake door when said fresh air intake port is opened by said fresh air intake door.

8. A blower unit according to claim 3, including a cable for actuating said driving pivotal lever, said cable having a fitting portion, and wherein said linked state-setting means comprises a portion of said driving pivotal lever, said portion defining at least two engaging holes therein for selective engagement with said fitting portion of said cable, to thereby selectively realize one of said first linked state and said second linked state of said recirculating air intake door and said fresh air intake door.

9. A blower unit according to claim 8, wherein said cable has an end cover, and wherein said linked state-setting means comprises a plurality of cable holders formed on said casing, for selective engagement with said fitting portion of said cable.

10. A blower unit according to claim 8, including another recirculating intake port that is opened by said fresh air intake door when said fresh air intake port is closed by said fresh air intake door, and closed by said fresh air intake door when said fresh air intake port is opened by said fresh air intake door.

* * * * *